Aug. 24, 1943.   G. QUAYLE   2,327,847
SKID PLATFORM
Filed Dec. 5, 1941
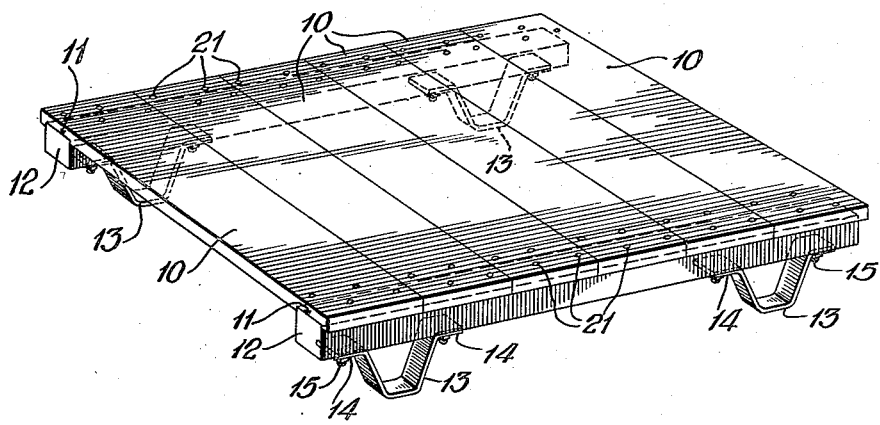
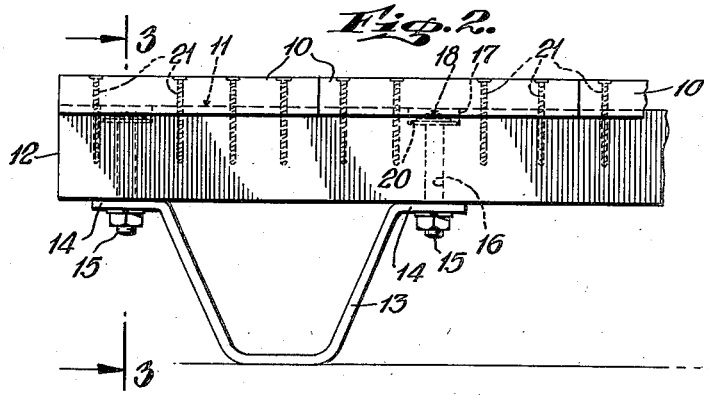
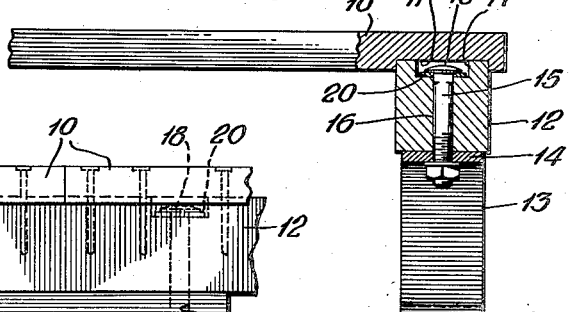
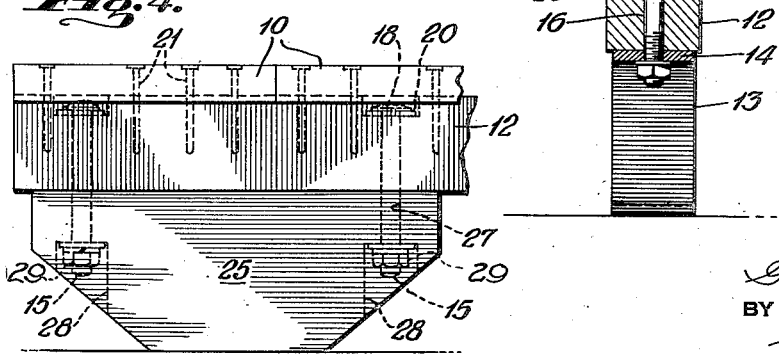
INVENTOR
George Quayle
BY
A. H. Golden
ATTORNEY Patented Aug. 24, 1943

2,327,847

UNITED STATES PATENT OFFICE 2,327,847

SKID PLATFORM

George Quayle, Philadelphia, Pa., assignor to The Yale & Towne Manufacturing Company, Stamford, Conn., a corporation of Connecticut Application December 5, 1941, Serial No. 421,730

4 Claims. (Cl. 248—120)

This invention relates to a skid platform. More particularly my invention relates to a skid platform having a floor formed of a series of boards which are assembled relatively to a series of legs.

It is a feature of my invention to eliminate, so far as is possible, the use of metal in the fabrication of a skid platform. Thus, it has been customary in prior art constructions to maintain the steel legs of a skid platform assembled to the floor boards by the use of angle irons or channels through the welding or bolting of the angle irons or channels, together with the steel legs, to the boards of the platform. In my invention, the legs, whether formed of steel or wood, are adapted to be secured to stringers which are assembled to the floor boards and which maintain the floor boards in proper relation to the legs.

As a further feature of my invention, I utilize stringers adapted for insertion into grooves formed at the sides of the floor of a skid whereby to better hold the floor boards assembled to the stringers to form a skid floor. A still further feature of my invention is the economy of manufacture that results from the use of my invention.

I have thus described my invention generally in order that the detailed description thereof which follows may be better understood. Naturally, I consider my invention a relatively important one in this narrow art, and shall expect patent claims which will prevent the utilization of all or part of my contribution in specific forms other than those which I shall describe hereinafter.

Referring now to the drawing, Fig. 1 is a perspective view of an assembled skid platform embodying my invention. Fig. 2 is a side elevation of part of Fig. 1. Fig. 3 is a section taken along lines 3—3 of Fig. 2. Fig. 4 is a view similar to Fig. 2 but illustrating the assembly of a wooden leg to a stringer and thus to the skid platform floor.

Referring now more particularly to the drawing and especially Figs. 1, 2 and 3, my skid platform is shown as having a floor formed of a series of wood boards 10. Each of the boards 10 is formed with a pair of grooves 11 on the underside thereof, and with the grooves 11 of the several boards aligned, so that when the boards 10 are in the position of Fig. 1, a stringer 12 may readily be placed in the aligned grooves 11.

Each stringer 12 is preferably formed of wood, and is adapted to have assembled thereto, two or more steel legs 13 formed with flanges 14 drilled for the passage of bolts 15. The bolts 15 pass through bores 16 in the stringers which are counterbored at 17 for the heads 18 of the several bolts 15. Washers 20 are inserted under the heads 18 of the bolts 15 to prevent the pulling through of the bolts 15 through the wood of the stringers 12 under such severe stresses as may be applied to the legs 13.

In actual manufacture, the legs 13 are assembled to the stringers 12 as I have described, to form a sub-assembly, and the stringers 12 of this sub-assembly may then be placed in the grooves 11 of the several boards 10 of any size skid which it is desired to fabricate. The same sub-assembly may be used on many sizes of skids. Through the driving of the staggered nails 21 downwardly from the upper surface of the several boards 10 of the skid platform floor into the stringers 12, the stringers are held in assembled relation to the boards 10, and with the boards 10 therefore held in assembled relation to one another and to the stringers and the legs 13 to form a completed skid platform. The manufacturing economies as well as the savings of materials will be readily appreciated by those skilled in the art.

In Fig. 4, I utilize instead of the legs 13, wooden blocks 25 which act as legs for the skid platform. The wooden blocks are bored at 27 for the passage of the bolts 15, and are counterbored at 28 for the accommodation of the nuts 29. In this manner, the wooden legs or blocks 25 are assembled to the stringers 12, the stringers 12 then being assembled to the several floor boards 10 to form a completed skid platform in the same manner as described in the modification of Figs. 1, 2 and 3.

I now claim:

1. In a skid platform of the class described, a floor comprising a series of wood boards in juxtaposed side by side position, the underside of said floor having a groove therein transversely of said boards near each side edge of said floor and with both sides of each groove displaced from the side edges of the floor, a wood stringer mounted in each of said grooves and extending downwardly and outwardly of said grooves, and means whereby said stringers are secured in said grooves and relatively to said boards to form an assembled skid floor.

2. In a skid platform of the class described, a floor comprising a series of wood boards in juxtaposed side by side position, the underside of said floor having a groove therein transversely of said boards near each side edge of said floor and with both sides of each groove displaced from the side edges of the floor, a wood stringer mounted in each of said grooves and extending downwardly and outwardly of said grooves, means whereby said stringers are secured in said grooves and relatively to said boards to form an assembled skid floor, and legs secured to said stringers and through said stringers assembled to the floor.

3. In a skid platform of the class described, a floor comprising a series of wood boards in juxtaposed side by side position, the underside of said floor having a groove transversely of said boards near each side edge of said floor and with both sides of each groove displaced from the side edges of the floor, a wood stringer in each of said grooves and secured in said grooves and relatively to said boards to form an assembled skid floor, a portion of each stringer extending downwardly and outwardly of said grooves, legs for said skids having flanges to be applied to the extending undersurfaces of said stringers, and bolts adapted to pass vertically through said flanges and said stringers to secure said legs to said stringers.

4. In a skid platform of the class described, a floor comprising a series of wood boards in juxtaposed side by side position, the underside of said floor having a groove transversely of said boards near each side edge of said floor and with both sides of each groove displaced from the side edges of the floor, a wood stringer in each of said grooves and secured in said grooves and relatively to said boards to form an assembled skid floor, a portion of each stringer extending downwardly and outwardly of said grooves, legs for said skid having horizontal flanges for application to the undersurfaces of said stringers and adapted for the passage of vertical bolts whereby said legs are bolted to said stringers, the bolts being inserted in countersunk bores in the upper surfaces of said stringers to leave unobstructed said upper surfaces of said stringers for application in said grooves.

GEORGE QUAYLE.